W. SIEBENMORGEN.
METHOD OF AND APPARATUS FOR OPERATING ELECTRIC MOTORS.
APPLICATION FILED JULY 31, 1909.

1,101,214.

Patented June 23, 1914.

Witnesses:
C. A. Jarvis
C. T. Neal

Inventor:
William Siebenmorgen.
by Emerson Stockwell
his attorney.

UNITED STATES PATENT OFFICE.

WILLIAM SIEBENMORGEN, OF WESTFIELD, NEW JERSEY, ASSIGNOR, BY MESNE ASSIGNMENTS, TO C. & C. ELECTRIC & MANUFACTURING COMPANY, A CORPORATION OF NEW JERSEY.

METHOD OF AND APPARATUS FOR OPERATING ELECTRIC MOTORS.

1,101,214. Specification of Letters Patent. Patented June 23, 1914.

Application filed July 31, 1909. Serial No. 510,537.

*To all whom it may concern:*

Be it known that I, WILLIAM SIEBENMORGEN, a citizen of the United States, residing at Westfield, New Jersey, have invented certain new and useful Improvements in Methods of and Apparatus for Operating Electric Motors, of which the following is a clear, full, and exact description.

My invention relates to a method of and apparatus for operating electric motors, and my object is to improve on the methods and constructions heretofore used.

In order to obtain a wide range of speed or power with two motors which drive the same load, it has been common to provide two motors and to operate them in series for the lower speeds and in parallel for the higher speeds, and to obtain intermediate speeds mainly by the introduction of external resistances in the armature circuits. Such methods of control are, however, open to many objections both on account of the waste of power entailed in the use of large ohmic resistances, and the impossibility of obtaining a great range of speed without a great waste of power.

Various constructions and methods have been proposed to obviate some of the foregoing objections, among which may be mentioned the following patents: 690,809, 690,810, 690,807, 734,724, 747,236, 557,185, 743,601, 573,979, 517,948, 444,900. In some of said patents it has been proposed to use motors whose armatures develop different counter electromotive forces at the same speeds or same relative speeds, such as by providing one of the armatures with a greater number of turns than the other, but each one of them has inherent defects which are overcome by my invention.

Figure 1:
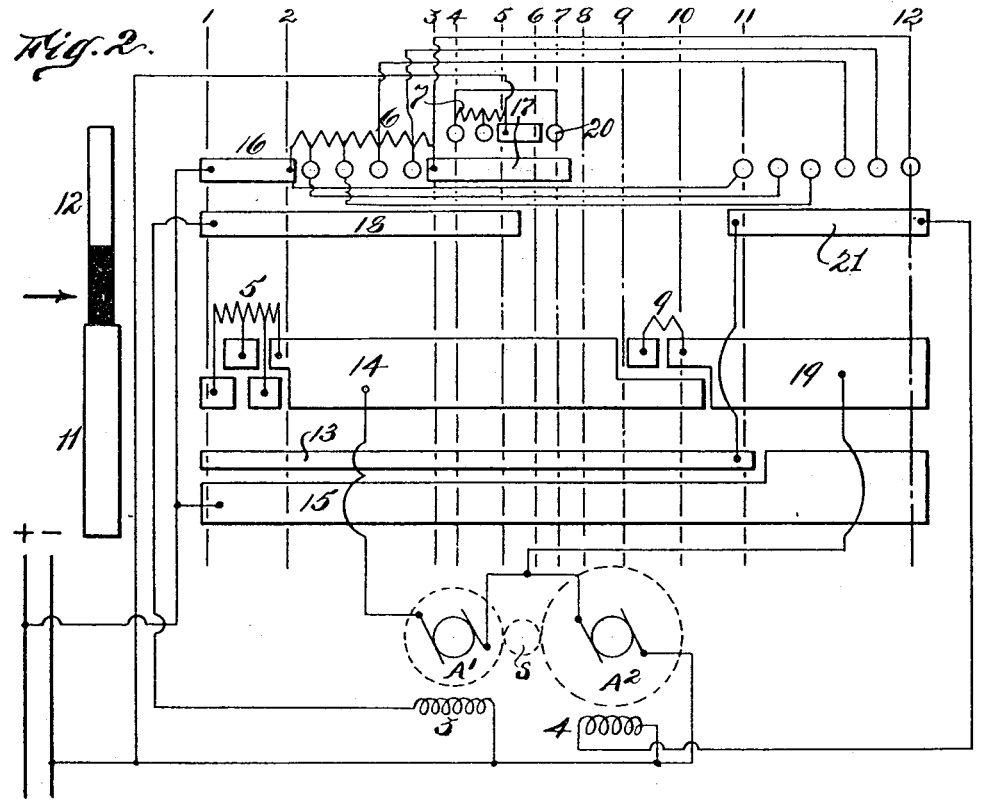
Figure 1:
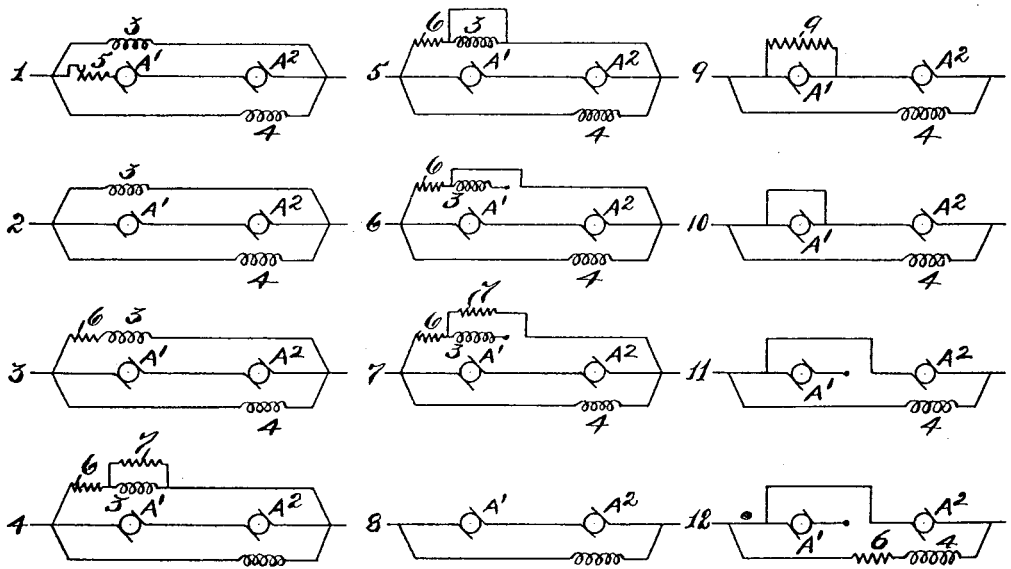

In the drawings which show a preferred embodiment, Figure 1 shows diagrammatically the different connections made by the controller shown in Fig. 2, and Fig. 2 is an embodiment of a controller for causing those connections.

In carrying out my invention I have provided two motors, which are preferably shunt-wound, and whose rotors (preferably the armatures) are mechanically connected or coupled, such as by being geared to the same load, so that their rotors revolve at the same speed ratio at whatever speed the load is driven. The armatures develop different counter electromotive forces at the same speed of the load, and this is preferably accomplished by providing one of the armatures with a greater number of turns than the other armature. As it is preferable to have both motors alike or substantially alike in size, I may correspondingly decrease the size of the wire in the armature of the one which has the greater number of turns.

In a motor, where we assume $E$ = the counter electromotive force, $n$ the number of revolutions per second, $Z$ the number of conductors in series on the armature counted all around the periphery, and $N$ the strength of the field, it is well known that $E = n Z N$ (nearly). When two motors are used and the armatures are mechanically connected so as to rotate at the same angular speeds, and the armatures are connected in series, the total counter electromotive force developed by the two armatures will be equal to the sum of their counter electromotive forces, and therefore if we postscribe 1 to each value of one motor and 2 to each value of the other motor, in order to indicate which motor any particular value belongs to, $$E \text{ (total counter electromotive force)} = E^1 + E^2 = (n^1 Z^1 N^1) + (n^2 Z^2 N^2),$$

but as $n^1 = n^2$ the equation may be written $$E^1 + E^2 = n[(Z^1 N^1) + (Z^2 N^2)]$$

from which $$n = \frac{E^1 + E^2}{(Z^1 N^1) + (Z^2 N^2)} \text{ (nearly)},$$

and the revolutions per minute $$(60n) = \frac{60(E^1 + E^2)}{(Z^1 N^1) + (Z^2 N^2)} \text{ (nearly)}.$$

If the fields ($N^1$ and $N^2$) are alike and $Z^1$ is greater than $Z^2$, $E^1$ and $E^2$ will increase as the speed increases so long as both fields remain the same, but as $Z^1$ is greater than $Z^2$ and the total counter electromotive force is equal to $E^1 + E^2$, then (assuming a constant impressed electromotive force) $E^1$ cannot at any given speed rise to the value it would have if the motor having the greater number of turns were operated independently at that speed. The speed at which a motor operated alone will run varies nearly inversely as the strength of the field. Therefore from the above equation, $$n = \frac{E^1 + E^2}{(Z^1 N^1) + (Z^2 N^2)}$$

a decrease in $N^1$ will result in a greater combined speed than a decrease in $N^2$ would, and if $N^1$ (and consequently $E^1$) is decreased to zero, armature $Z^1$ may be cut out as it will not thereafter affect the equation. $N^2$ may then be decreased to further increase the speed.

The mechanical work done or horse power delivered by a motor is equal to the product of the angular speed times the torque, also to E times $Ca$, where $Ca$ is the current in the armature. The armature current is equal to the voltage across its armature terminals minus its counter electromotive force, both being divided by the resistance of the armature circuit. By the formula $E = n_1 Z_1 N_1$, a decrease in the field strength will at that instant (before the speed rises) decrease the counter electromotive force and allow a greater current to flow through the armature, thus exerting a greater torque or power, which (other factors remaining the same) will increase the speed of rotation, thus in turn increasing E (and consequently decreasing $Ca$) until E is equal to the voltage across the armature terminals, less of course the losses due to eddy currents, etc. In the case of two motors mechanically coupled together with their armatures in series and having fields of the same strength but with more turns on one armature ($A^1$) than on the other ($A^2$), a decrease in the field strength of $A^1$ will increase the speed, and thus increase both $E^1$ and $E^2$ until their sum equals the impressed electromotive force less the internal losses. With each increase in speed to the maximum for that strength field, $E^1$ will decrease and $E^2$ increase beyond what they were before the field was reduced. A reduction in the field strength of $A^1$ only will therefore instantaneously decrease $E^1$ only, consequently temporarily increasing the armature current in both armatures and exerting more torque on both $A^1$ and $A^2$, thus increasing the speed until $E^1 + E^2 =$ its maximum value, which will decrease the torque on both but will make the torque on $A^1$ less and that on $A^2$ more than they were at the instant the field was weakened. As the power developed $= ECa$, and $E = E^1 + E^2$, and $$Ca = \frac{\text{(impressed electromotive force)} - E^1 + E^2}{R}$$

a decrease in $E^1$ will (if the speed remains the same) increase the power, or (by equation $$n = \frac{E^1 + E^2}{(Z^1 N^1) + (Z^2 N^2)})$$

will increase the speed if the load is not changed. By successive steps in decrease of $N^1$ the counter electromotive force and power of $A^1$ may be gradually reduced to zero, thus gradually increasing the speed of the apparatus and gradually transferring the work done, and the counter electromotive force developed, by that motor having the greater number of turns to the one which has the less, and solely by field control.

Great range of speed without the use of external ohmic resistance in the armature circuit, may be obtained by winding $A^1$ with many turns compared with $A^2$, so that, even with full strength in both fields at start, the counter electromotive force developed by $A^1$ will at the slowest speed nearly reach the sum of $E^1 + E^2$, and therefore give a slow initial running speed, while the comparatively few turns on $A^2$ will, after $A^1$ is removed from the circuit, enable the operator to still further increase the speed of the apparatus much beyond that possible with the two when in series, and this too by merely reducing the field of $A^2$ in a similar manner. This is important in driving apparatus where a steady increase of speed without any jerks is desired, such as in web printing presses and other apparatus, for minute graduations in field strength are easily obtainable.

The foregoing principles are particularly applicable to the case of shunt-wound motors, in which the shunt field-winding is usually a great number of turns of fine wire. The greatest range of speed of a single shunt motor alone, which is obtainable by field control solely, is about 1 to 6, that is, if the impressed voltage across its armature terminals is not changed and it runs at for example 100 revolutions per minute with full strength field, its speed can be increased, by field reduction solely, to only about 600 R. P. M. The same is true if two shunt motors exactly alike are coupled together.

With two shunt wound motors, mechanically connected together so as to rotate at the same speed ratio, with their armatures connected in series so that the current through each is substantially the same and whose armatures have a great difference in the number of turns, the range of speed may be greatly increased, as will be obvious from the foregoing explanation. The comparatively large number of turns on the slow speed armature enables the apparatus to run at a very slow initial speed, as of course the torque is correspondingly great on account of the larger number of turns, and the motors may be made the same size if the size of the wire in the slow speed armature is correspondingly reduced. Of course the size should be sufficient to properly carry the current which it may be called upon to conduct. The counter electromotive force developed by the slow speed armature is of course irrespective of the size of the wire, and the same principles would apply even though the wire were of the same size as that in the high speed armature, but this would entail an increase in the size of the slow speed motor which would be objectionable in most cases. It is therefore preferable to decrease the size of the wire in the slow speed armature.

Referring now to the drawings which show an example of my method of control, $A^1$ is the armature and 3 the shunt field of the slow speed motor, and $A^2$ the armature and 4 the shunt field of the high speed motor. The armatures are connected in series. The two rotors (in this case the armatures) are mechanically connected or coupled together such as by being geared to the same load S as indicated in Fig. 2, so as to rotate at the same speed ratio. This ratio may be 1 to 1 if the gears are of the same size, as shown in Fig. 2, or if both armatures are on the same shaft, or may have any other ratio desired, as will be obvious. The fields may be alike, and are preferably both at full strength at start, and it is preferable to keep the field 4 of the high speed armature full strength until the slow speed motor is cut out. This may not be necessary in all cases. The slow speed armature $A^1$ is wound with more turns than the high speed armature $A^2$, and will therefore do most of the work at the initial slow speed.

5 is a starting resistance, used merely to prevent a too great rush of current until it can be taken care of by the counter electromotive force developed, which is cut out to bring the apparatus up to the initial slow speed which is represented in Diagram 2.

In order to reduce the strength of the field 3 to gradually increase the speed, a resistance 6 may be gradually inserted in the field circuit if desired, the field then shunted through the resistance 7, and the resistance gradually cut out, as shown in Diagram 5, thus gradually bringing the field strength substantially to zero, after which the field may be cut out as shown in Diagram 6 leaving armature $A^1$ running free and developing no counter electromotive force, or substantially none. The shunt field circuit may then be opened (first inserting a resistance 7 as shown in Diagram 7, if desired) leaving the circuit as shown at 8, after which the armature $A^1$ may be shunted (through a resistance 9 and the resistance cut out as shown at 10 if desired) and the armature then disconnected as shown in the position 11. Diagrams 6–8 are transitory positions, as they do not affect the current in the armature circuit. The apparatus will then be driven by the high speed motor alone, with its field 4 at full strength and will then be running at its slowest individual running speed. The speed may then be further increased by reducing the field strength of the high speed motor, for example by gradually inserting a resistance 6 in the field circuit. It will be obvious that I do not desire to limit myself to the particular steps or method of weakening the fields which have been illustrated, as this may be accomplished in various ways.

In order to show the wide difference between my method of control and that possible by field control only where a single independent shunt wound motor is used, the speed range ratio obtained by field control solely in one independent shunt-wound motor or two motors which are alike and coupled together, is only about 1 to 6, yet with two motors the turns on whose armatures differ and which are controlled in the manner heretofore explained, I may obtain any speed range ratio desired up to 1 to 42, or even higher, that is, if the two motors are designed to run at an initial slow speed of say 100 revolutions per minute when in series as indicated in Diagram 2 of Fig. 1, I may, by field control solely, gradually increase the speed, until by the high speed motor alone the speed will reach 4200 or even higher. The difference in the number of turns necessary upon the two armatures will partly depend upon the ratio between the initial slow speed and the highest speed. Roughly this may be taken as one to the square root of the higher number of the ratio between the lowest initial speed with full strength fields and maximum impressed electromotive force, and the highest speed of the high speed motor used alone and with its field weakened to the greatest extent. For example, if the apparatus is desired to be run at an initial slow speed of 100 with both motors, and at 2000 by the high speed motor alone, the number of turns on the slow speed armature may be to the number of turns on the high speed armature as somewhat less than the square root of 20 (say 4) is to 1. This, however, should not be taken as an invariable ratio, because it may be considerably varied depending upon the conditions confronting the designer. If, for example, it were desired to have the speed range ratio 1 to 20 as before but it were not desired to run for long periods on the slow speeds, but only on the higher speeds, the ratio of the number of turns might be increased to, for example, 5 to 1; and vice versa, if it were desired to run for long periods on the slow speeds the ratio might be 3 to 1, for example.

Of course the maximum strength of the fields, and the number of turns on the two armatures, and the gradations of field reduction necessary, would depend on the particular work to be done. It will be obvious to any one skilled in the art that if an electrician is to design the machine to operate with a given load at a given slow speed and to obtain the speed range ratio which he may desire, it would, after the foregoing explanations, be a mere question of calculation from known electrical formula, in view of the particular conditions he wishes to obtain, in order to obtain that result. Therefore no detailed explanation of such calculations need be here inserted for this would be apparent to designers skilled in the art.

Of course while I have explained my method with particular reference to only two motors, it may as well be adapted to more than two, each having a different number of turns. The principles above explained would still hold good, the only additions being that the additional motor or motors would have to be taken into consideration.

In Fig. 2 I have shown a controller which may be used for obtaining the connections shown in Fig. 1. 11, 12 is a moving brush, and the other blocks and bars are stationary. When the moving brush reaches the position shown in dotted line 1, the circuits shown in position 1 of Fig. 1 are closed, and as the brush moves to the successive positions indicated by dotted lines 2 to 12, the changes in the circuits indicated by the Diagrams 2 to 12 of Fig. 1 will be obtained. Position 2 is the initial running speed with all external resistance removed from the armature circuit. As the controller is moved farther to the right, it will gradually reduce the strength of the field 3 of the slow speed motor until the same is practically dead, their cut it out, and thereafter increase the speed of the high speed motor to its maximum by weakening its field. This controller shown in Fig. 2 is only illustrative of what might be used.

What I claim is:

1. The method of operating two motors by successive steps while their armatures are electrically connected in series, whose rotors are mechanically coupled so as to rotate at the same speed ratio and whose armatures develop different counter electromotive forces at the same relative speed, which consists in gradually reducing to substantially zero the field strength of the slow speed motor while maintaining said series connection and said mechanical coupling.

2. The method of increasing the speed of a high speed and a slow speed motor by successive steps while their armatures are electrically connected in series, whose rotors are mechanically coupled so as to rotate at the same speed ratio and whose armatures develop different counter electromotive forces at the same relative speed, which consists in gradually reducing to substantially zero the field strength of the slow speed motor while maintaining said series connection and said mechanical coupling and while substantially maintaining the armature current.

3. The method of increasing the speed of a high speed and a slow speed motor by successive steps while their armatures are electrically connected in series, whose rotors are mechanically coupled so as to rotate at the same speed ratio and whose armatures develop different counter electromotive forces at the same relative speed, which consists in gradually reducing to substantially zero the field strength of the slow speed motor while maintaining said series connection and said mechanical coupling and without materially reducing the armature current, and then cutting out the slow speed armature.

4. The method of increasing the speed of a high speed and a slow speed motor by successive steps while their armatures are electrically connected in series, whose rotors are mechanically coupled so as to rotate at the same speed ratio and whose armatures develop different counter electromotive forces at the same relative speed, which consists in gradually reducing to substantially zero the field strength of the slow speed motor while maintaining said series connection and said mechanical coupling and without materially reducing the armature current, then cutting out the slow speed armature, and operating the load by gradually reducing the field strength of the high speed motor.

5. The method of operating two shunt-wound motors by successive steps while their armatures are electrically connected in series, whose rotors are mechanically coupled so as to rotate at the same speed ratio, the turns on the armatures of which differ in number, which consists in gradually reducing to substantially zero the field strength of that motor whose armature has the greater number of turns while maintaining said series connection and without materially reducing the armature current, then shunting and cutting out said armature, and thereafter increasing the speed by gradually reducing the field strength of the other motor.

6. The method of gradually increasing the sum of the powers of two motors by successive steps while their armatures are connected in series so that substantially all the current through one armature also passes through the other, whose rotors are mechanically coupled so as to rotate at the same speed ratio and whose armatures develop different counter electromotive forces at the same relative speed, which consists in gradually reducing to substantially zero the counter electromotive force of the slow speed motor by gradually reducing the field strength of the same, while substantially maintaining the armature current and while maintaining said series connection and said mechanical coupling.

7. The method of increasing the sum of the powers of two motors by successive steps while their armatures are directly connected in series so that substantially all the current through one armature also passes through the other, whose rotors are mechanically coupled so as to rotate at the same speed ratio and whose armatures develop different counter electromotive forces at the same relative speed, which consists in gradually reducing the counter electromotive force of the slow speed motor by gradually reducing the field strength of the same, without materially reducing the armature current and while maintaining said series connection, continuing such reduction of said field until the armature is substantially dead, shunting the same, cutting out said armature and further increasing the power by reducing the field strength of the other motor.

8. The method of operating two motors while their armatures are electrically connected in series, whose rotors are mechanically coupled so as to rotate at the same speed ratio and whose armatures have a different number of turns, which consists in increasing the speed by successive steps, each step comprising weakening the field of that motor which has the greater number of turns in such a way as to cause a temporary increase of current through both armatures, thereby increasing the speed, and continuing such steps until the field of said motor is reduced to substantially zero.

9. The method of operating two motors while their armatures are electrically connected in series, whose rotors are mechanically coupled so as to rotate at the same speed ratio and whose armatures have a different number of turns, which consists in increasing the speed by successive steps, each step comprising weakening the field of that motor which has the greater number of turns in such a way as to cause a temporary increase of current through both armatures, thereby increasing the speed, continuing said steps until the counter electromotive force of said armature is reduced substantially to zero, then cutting out said armature and operating the apparatus by the other motor.

10. The method of operating two motors having shunt field windings, whose rotors are mechanically coupled together so that one drives the other, and the turns on whose armatures materially differ in number and whose armatures are in series so that substantially the same current passes through each, which consists in gradually reducing to substantially zero the counter electromotive force of that armature which has the greater number of turns by gradually reducing its field strength without reducing the combined power of the two motors, cutting out said armature, and gradually reducing the field strength of the other motor.

11. The method of operating two shunt-wound motors whose rotors are mechanically coupled together so that one drives the other, and the turns on whose armatures materially differ in number and whose armatures are in series so that substantially the same current passes through each, which consists in gradually reducing to substantially zero, by field variation alone, the counter electromotive force of that armature which has the greater number of turns, connecting the other armature around the former and cutting said former armature out, and gradually reducing the field strength of the other motor.

12. The method of operating two shunt-wound motors whose rotors are mechanically coupled together so that one drives the other, and the turns on whose armatures materially differ in number and whose armatures are in series so that substantially the same current passes through each, which consists in gradually reducing to substantially zero, by field variation alone, the counter electromotive force of that armature which has the greater number of turns, shunting said armature by a connection in series with the other armature, cutting the former armature out, and gradually reducing the field strength of the other motor.

13. Two motors whose armatures have a different number of turns and are electrically connected in series so that substantially all the current of each also passes through the other, a mechanical connection between the rotors of said motors whereby they rotate at the same speed ratio, in combination with a controller adapted to gradually reduce to substantially zero the field strength of that armature which has the greater number of turns and thereafter cut out said armature.

14. Two shunt motors whose armatures have a different number of turns and are electrically connected in series so that substantially all the current of each also passes through the other, a mechanical connection between the rotors of said motors whereby they rotate at the same speed ratio, in combination with a controller adapted to gradually reduce to substantially zero the field strength of that armature which has the greater number of turns and thereafter cut out said armature.

15. Two motors whose armatures have a different number of turns and are electrically connected in series so that substantially all the current of each also passes through the other, a mechanical connection between the rotors of said motors whereby they rotate at the same speed ratio, in combination with a controller adapted to gradually reduce to substantially zero the field strength of that armature which has the greater number of turns and thereafter cut out said armature, said controller being also provided with mechanism and connections to thereafter gradually reduce the field strength of the other motor.

16. Two motors whose armatures have a different number of turns and are electrically connected in series so that substantially all the current of each also passes through the other, a mechanical connection between the rotors of said motors whereby they rotate at the same speed ratio, in combination with a controller adapted to gradually reduce to substantially zero the field strength of that armature which has the greater number of turns and without substantially decreasing the field strength of the other motor, said controller being also provided with mechanism and connections to thereafter gradually reduce the field strength of the other motor.

17. The method of increasing the speed of two electric motors whose armatures develop different counter-electromotive forces at the same relative speed, which consists in gradually reducing to substantially zero the counter-electromotive force developed by that armature which develops the greater counter-electromotive force and thereby gradually increasing the counter-electromotive force of the other, substantially by field control alone and while maintaining the rotors mechanically coupled and the armatures connected in series, and thereafter varying the speed of the other motor.

18. The method of increasing the speed of two electric motors whose armatures develop different counter-electromotive forces at the same relative speed, which consists in gradually reducing to substantially zero the counter-electromotive force developed by one armature and thereby gradually increasing the counter-electromotive force of the other, substantially by field control alone and while maintaining the rotors mechanically coupled and the armatures connected in series, and thereafter varying the speed of the other motor by reducing its field strength.

Signed at New York, N. Y., this 28th day of July, 1909.

WILLIAM SIEBENMORGEN.

Witnesses:
EMERSON R. NEWELL,
BEATRICE MIRVIS.

Copies of this patent may be obtained for five cents each, by addressing the "Commissioner of Patents, Washington, D. C."